United States Patent
Nezou et al.

(10) Patent No.: US 8,838,720 B2
(45) Date of Patent: Sep. 16, 2014

(54) METHOD FOR MANAGING A DISTRIBUTION OF BANDWIDTH IN A COMMUNICATIONS NETWORK, CORRESPONDING COMPUTER-READABLE STORAGE MEDIUM AND SLAVE NODE

(75) Inventors: Patrice Nezou, Saint-Sulpice la Foret (FR); Pascal Lagrange, Rennes (FR); Lionel Tocze, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 723 days.

(21) Appl. No.: 12/905,060

(22) Filed: Oct. 14, 2010

(65) Prior Publication Data

US 2011/0087751 A1   Apr. 14, 2011

(30) Foreign Application Priority Data

Oct. 14, 2009   (FR) ...................... 09 57192

(51) Int. Cl.
*G06F 15/16* (2006.01)
*H04W 16/18* (2009.01)
*H04W 72/08* (2009.01)

(52) U.S. Cl.
CPC ............ *H04W 16/18* (2013.01); *H04W 72/085* (2013.01)
USPC ........................................................ 709/208

(58) Field of Classification Search
CPC .......................... H04W 16/18; H04W 72/085
USPC ........................................................ 709/208
See application file for complete search history.

(56) References Cited

U.S. PATENT DOCUMENTS 5,349,580 A     9/1994 Hester et al. ...................... 370/84
6,469,997 B1 * 10/2002 Dorenbosch et al. .......... 370/337

(Continued)

OTHER PUBLICATIONS

French Search Report and Written Opinion dated Jun. 22, 2010 in corresponding French Application No. FR0957192, and English-language translation of the Written Opinion.

(Continued)

*Primary Examiner* — Asad Nawaz
*Assistant Examiner* — Saad A Waqas
(74) *Attorney, Agent, or Firm* — Fitzpatrick, Cella, Harper & Scinto

(57) ABSTRACT

A method is proposed for managing a distribution of bandwidth in a communications network by means of a slave node of the network, said network comprising a set of nodes.
The slave node is such that it performs steps for:
  determining a coarse representation and a detailed representation of the distribution of the bandwidth in said network, as a function of a piece or pieces of information relative to conditions of transmission in said network and/or relative to applications needs of transmission;
  receiving a coarse reference representation of the distribution of bandwidth in said network, coming from a master node of said network;
  comparing said determined coarse representation and said reference coarse representation;
  should said coarse representations be identical, applying said determined detailed representation;
  if not, applying said coarse reference representation.

7 Claims, 10 Drawing Sheets

(56) References Cited

U.S. PATENT DOCUMENTS

Figure 1:
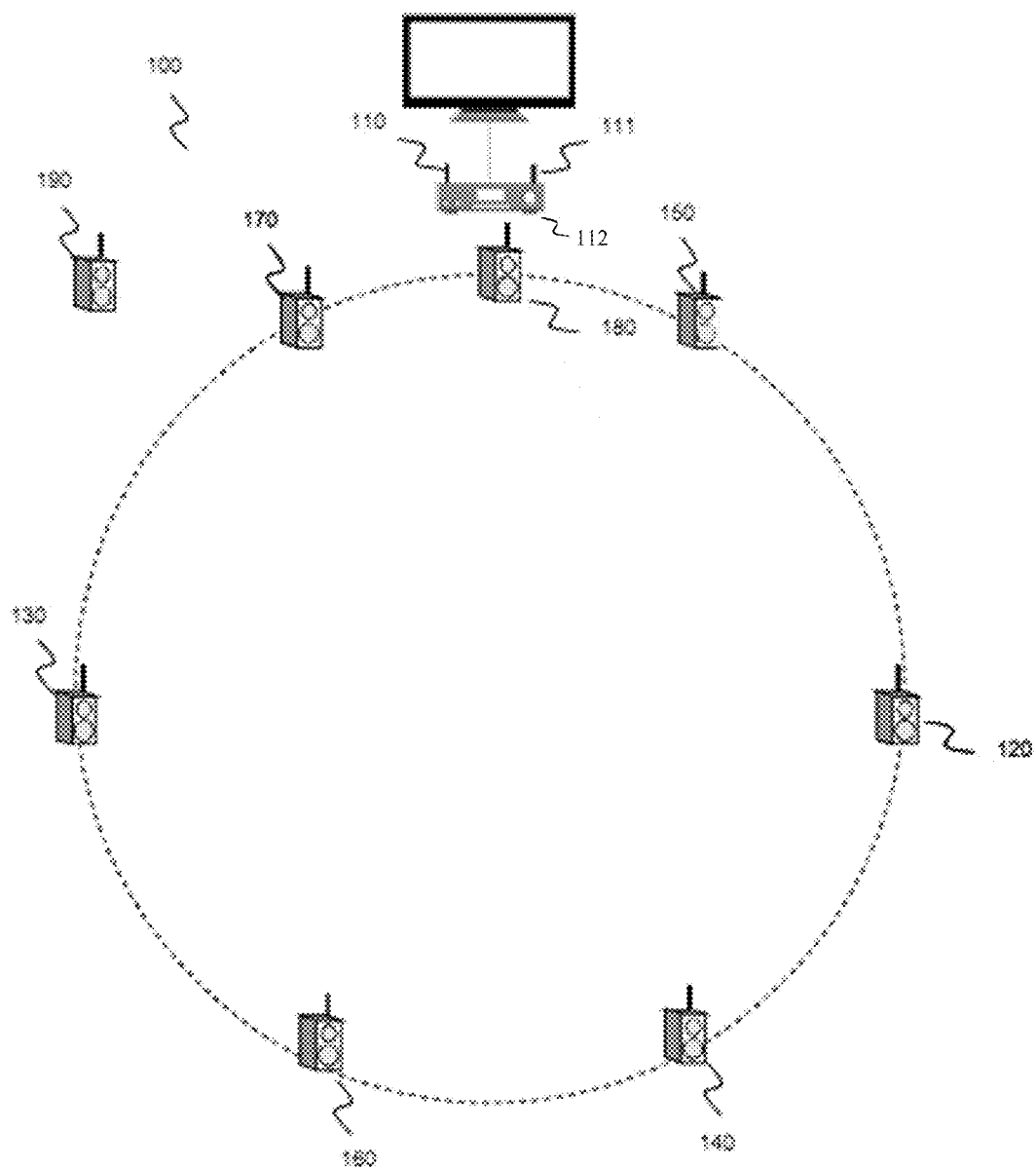

| | | | |
|---|---|---|---|
| 6,826,401 B1 | 11/2004 | Morvan et al. | 455/435.1 |
| 7,159,042 B1 | 1/2007 | Morvan et al. | 709/248 |
| 7,747,783 B2 | 6/2010 | Morvan et al. | 709/248 |
| 2004/0258033 A1* | 12/2004 | Heinonen et al. | 370/338 |
| 2004/0264466 A1* | 12/2004 | Huang | 370/392 |
| 2005/0041613 A1* | 2/2005 | Kuhl et al. | 370/320 |
| 2006/0153127 A1 | 7/2006 | Lee | 370/329 |
| 2007/0116029 A1* | 5/2007 | Di Lodovico et al. | 370/442 |
| 2008/0019347 A1 | 1/2008 | Shin et al. | 370/345 |
| 2008/0182515 A1* | 7/2008 | Cheng | 455/41.2 |
| 2009/0143024 A1 | 6/2009 | Tocze et al. | 455/77 |
| 2009/0161572 A1 | 6/2009 | Lagrange et al. | 370/252 |
| 2009/0180465 A1* | 7/2009 | Closset et al. | 370/350 |
| 2010/0095002 A1 | 4/2010 | Viger et al. | 709/226 |
| 2010/0131686 A1* | 5/2010 | Korrek | 710/105 |
| 2010/0159832 A1 | 6/2010 | Lagrange et al. | 455/41.2 |
| 2010/0195556 A1 | 8/2010 | Tocze et al. | 370/312 |
| 2010/0254407 A1* | 10/2010 | Tanaka et al. | 370/468 |

OTHER PUBLICATIONS

U.S. Appl. No. 12/835,516, filed Jul. 13, 2010 by Patrice Nezou and Mounir Achir.

U.S. Appl. No. 12/904,971, filed Oct. 14, 2010 by Lionel Tocze and Laurent Frouin.

U.S. Appl. No. 12/916,447, filed Oct. 29, 2010 by Brice Le Houerou and Pascal Lagrange.

* cited by examiner

METHOD FOR MANAGING A DISTRIBUTION OF BANDWIDTH IN A COMMUNICATIONS NETWORK, CORRESPONDING COMPUTER-READABLE STORAGE MEDIUM AND SLAVE NODE

This application claims priority from French Patent Application No. FR 0957192, filed on Oct. 14, 2009, the entire contents of which are incorporated by reference herein.

1. FIELD OF THE DISCLOSURE

The field of the disclosure is that of wireless communications networks comprising a set of nodes.

More specifically, the disclosure relates to a technique for managing bandwidth in such networks.

The disclosure is designed especially for managing changes in bandwidth distribution, for example following an insertion or elimination of a node or nodes in the network.

More generally, it can be applied to every case where a node sends out a request for modifying the distribution of the bandwidth.

2. BACKGROUND OF THE DISCLOSURE

Home networks or PANs (Personal Area Networks) are designed to interconnect digital communications devices, for example telephones, personal digital assistants, speakers, television units and multimedia players situated in proximity to the user. The range of such a network is of the order of a few meters. The nodes of such a network may be source nodes (or sender nodes), receiver nodes, relay nodes (which relay information from a first node to a second node), said nodes possibly having one or more antennas and combinations of functions.

Home networks can be wired (USB, Ethernet, Firewire) but can also rely on the use of a wireless medium. The term used for such a network is "wireless personal area network" or WPAN. The Bluetooth standards (IEEE 802.15.1), UWB, ZigBee (IEEE 802.15.4), IEEE 802.11 or IEEE 802.15.3 are presently the ones most used for this type of network.

Most of these protocols generally use a time division multiple access (TDMA) mode.

The TDMA mode is a multiplexing mode for transmitting several signals on a single channel. This is a time multiplexing mode using the principle of sharing the available time between the different connections (set up by nodes). By this means, a same carrier frequency can be used by several nodes. Each node of a network is assigned one or more time slots for the transmission of its own data and possibly for the relaying of data coming from other nodes. Each node thus sends at predetermined points in time in the network cycle.

Such wireless home networks use varied transmission frequencies, for example of the order of 60 GHz that are particularly well-suited to transmitting data at very high bit rates over a limited range. For example, the different elements of a home cinema form a network of this kind to exchange audio and/or video data at very high bit rates (beyond one gigabit per second) over a limited range of the order of about ten meters. Such wireless systems, although advantageous from the viewpoint of their intallation, nevertheless have high sensitivity to interference and masking or shadowing phenomena. This phenomenon of shadowing takes the form of the loss of a piece of data transmitted between a sender and a receiver, following the presence of an unexpected obstacle on the transmission path, such as for example a human passing between the sender and the receiver at the time of transmission. Thus, the relevance of using data paths between the various nodes of the network is heavily correlated with the progress of the positioning of the various mobile obstacles in the coverage area of the network; these obstacles are all so many dynamic shadowing phenomena for the network.

In the face of this shadowing phenomenon, the method of multiple transmissions of data symbols sent out on the network may prove to be particularly efficient to ensure efficient reception beyond a predefined residual bit error rate. This is the role of the relay nodes. This method is particularly well suited to applications requiring little bandwidth (of the order about 10 Mbps) such as the transmission of audio data or control or command data.

Such wireless networks are generally characterized by their scalability, i.e. their capacity to perceive the number of nodes forming part of the network evolve in time. Wireless nodes that are portable (digital camcorders, portable multimedia players etc.) or non-partable (such as wireless audio speakers) are capable of linking up to the wireless network randomly. This increases the number of requests for modifying the distribution of the bandwidth sent out by the nodes of the network, this number being already great to adapt the re-transmission scheme (or redundancy scheme) of the network to the developments and progress of interference (for example masking) on the radio communications links. In both cases, it proves to be essential to consider the latency with which a request for modifying bandwidth allocation is taken into account.

There are several known techniques for managing the distribution of bandwidth in a wireless network using a TDMA mode of access to the medium.

One known technique relies on the implementation in the network of a master node for determining a scheme for distributing bandwidth and transmitting it to the other nodes of the network, at each TDMA cycle. Thus, each node of the network knows about the distribution of the time slots of access to the medium (i.e. the distribution of the bandwidth) as well as the duration and position in the TDMA cycle of the time slot allotted to each node. This technique is presented especially in the US patent document 2008/0019347. This technique has the major drawback of being costly in terms of bandwidth. Indeed, the size of the bandwidth distribution scheme transmitted by the master node is great (up to about 32 kbits). Furthermore, owing to the particularly random nature of this type of wireless transmission medium, certain of the other nodes of the network or all of these other nodes of the network must relay this bandwidth distribution scheme. There is therefore a risk of overloading the bandwidth of the network or increasing the latency for setting up this distribution scheme.

There is therefore a need for a technique to reduce the latency for setting up, at each modification of the distribution of the bandwidth of the network (for example, in the case of the introduction of new nodes, the accommodation to new transmission conditions) of a new scheme for distributing radio data blocks in the overall bandwidth allocation scheme.

3. SUMMARY OF THE DISCLOSURE

In one particular embodiment of the disclosure, a method is proposed for managing a distribution of bandwidth in a communications network by a slave node of said network, said network comprising a set of nodes. The slave node performs steps of:
  determining a coarse representation and a detailed representation of the distribution of the bandwidth in said network, as a function of a piece or pieces of information relative to conditions of transmission in said network and/or relative to applications needs of transmission;

receiving a coarse reference representation of the distribution of the bandwidth in said network, coming from a master node of said network;

comparing said determined coarse representation and said reference coarse representation;

when said coarse representations are identical, applying said determined detailed representation;

if not, applying said coarse reference representation.

Thus, it is proposed to define the distribution of the bandwidths distributedly at each node of the network and in a manner that is dependent on the real conditions of transmissions in the network and/or on the applications needs of the transmission. Such needs are for example: a bit rate of data to be transmitted, the addition or withdrawal of a node from the network, a change in the number of relay nodes associated with a data stream.

More specifically, a technique is proposed in which a slave node itself decides on the scheme of distribution of the bandwidth that it must apply. To this end, the slave node determines a coarse representation and a detailed representation of the distribution of the bandwidth in the network. This determining is done deterministically on the basis of parameters pertaining to conditions of transmission in the network and/or applications needs of transmission. The slave node uses the coarse representation to control its computation consistency. Indeed, the slave node controls the consistency of the distribution determined by comparing the coarse representation that is has determined with a reference coarse representation generated by the master node of the network. Thus, it is possible to swiftly and efficiently find out if the distribution of the bandwidth determined by the slave node is wrong or not. The slave node can receive the coarse reference representation directly from the master node or by means of another slave node (by relaying).

Should the coarse representations of the slave node and of the master node be identical, the slave node estimates the distribution of the bandwidth that it has determined to be correct and consequently determines that it must be applied.

Should the coarse representation of the slave node and of the master node not be identical, the slave node estimates the distribution of the bandwidth that it has determined to be incorrect and consequently decides not to apply the detailed representation that it has determined but applies the reference coarse representation that it has received from the master node. Thus, the slave node is spared the implementing of an erroneous bandwidth distribution scheme. This therefore limits disturbances of the slave node during the re-configuring of the distribution of the bandwidth in the network.

Preferably, each coarse representation defines a sequence of access to the network, specifying transmission cycle time slots allocated to the nodes. Said detailed representation defines, for each time slot, data fields transmitted in said time slot.

According to one advantageous characteristic, said slave node applies said determined detailed representation when said coarse representations are identical or applies said coarse reference representation should said coarse representations be not identical after a determined number of consecutive transmission cycles starting from the reception of a piece of information coming from said master node.

In this way, all the nodes of the network change over synchronously in the new distribution of the bandwidth.

Advantageously, said slave node performs, preliminarily and upon reception of a piece of information coming from said master node and indicating a start of a period of information exchange of a predefined duration, steps of:

receiving, from the other nodes of said network, fixed information on conditions of transmission in said network determined by said other nodes;

transmitting to said other nodes of said network, fixed information on conditions of transmission in said network determined by said slave node.

Thus, it is planned that all the nodes of the network (master and slaves) will, for a predetermined duration, exchange fixed information on conditions of transmission in the network so that all the nodes of the network use the same information to compute their coarse representations.

Advantageously, should when coarse representations are not identical, said slave node performs a step of sending a piece of control information to the other nodes of said network, indicating that the coarse and detailed representations determined by said slave node are incorrect.

Thus, in the event of error in the computing of the distribution of the bandwidth by the slave node, this node informs the other nodes of the network that it is in a non-operational state, i.e. the fact that it has made no detailed representation and that it is applying the coarse representation of the master node. In other words, the control information sent out by the slave node is used to tell the other nodes of the network not to process (i.e. decode) the data blocks coming from the slave node on the basis on the detailed representation on the distribution of bandwidth that they have determined.

Advantageously, said slave node sends out said piece of control information in a data field that is contained in said time slot and has its position in said time slot predefined and fixed.

Thus, through this fixed data field, the other nodes of the network can efficiently and unambiguously obtain the control information reporting a wrong computation of the distribution of the bandwidth by the slave node.

According to one advantageous characteristic, when said coarse representations are not identical, said slave node furthermore performs a step of sending to said master node a request for modifying the distribution of the bandwidth.

According to one particular embodiment, in the event of error in computing the distribution of the bandwidth by the slave node, the slave node asks the master node to re-launch the bandwidth distribution process. Thus, the scalability of the system is improved.

In another embodiment, the disclosure pertains to a computer program product comprising program code instructions for implementing the above-mentioned method (in any of its different embodiments) when said program is executed on a computer.

In another embodiment, there is proposed a computer-readable storage means comprising a set of instructions executable by a computer to implement the above-mentioned method (in any of its different embodiments).

In another embodiment of the disclosure, a slave node is proposed comprising means for managing a distribution of bandwidth in a communications network comprising a set of nodes. The slave node comprises:

means for determining a coarse representation and a detailed representation of the distribution of the bandwidth in said network, as a function of a piece or pieces of information relative to conditions of transmission in said network and/or relative to applications needs of transmission;

means for receiving a coarse reference representation of the distribution of bandwidth in said network, coming from a master node of said network;

means for comparing said determined coarse representation and said reference coarse representation;

means for applying, that applies said detailed representation determined by said means for determining, when said means for comparing detect that said coarse representations are identical, or if not, applies said coarse reference representation.

Advantageously, each slave node has means for implementing steps that it performs in the method for managing as described here above in any of its different embodiments.

4. BRIEF DESCRIPTION OF THE DRAWINGS

Figure 2:
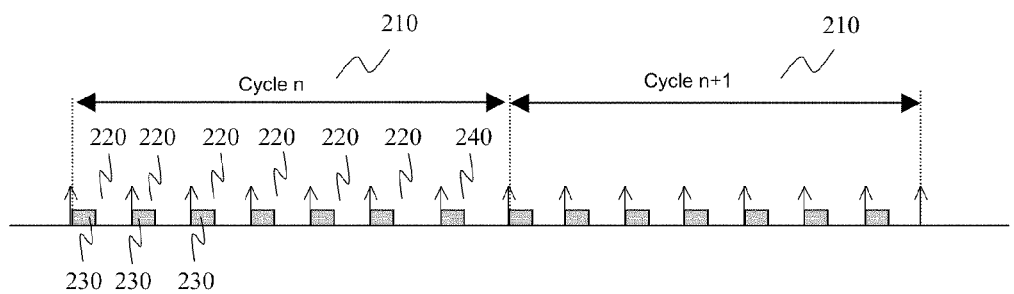
Figure 3:
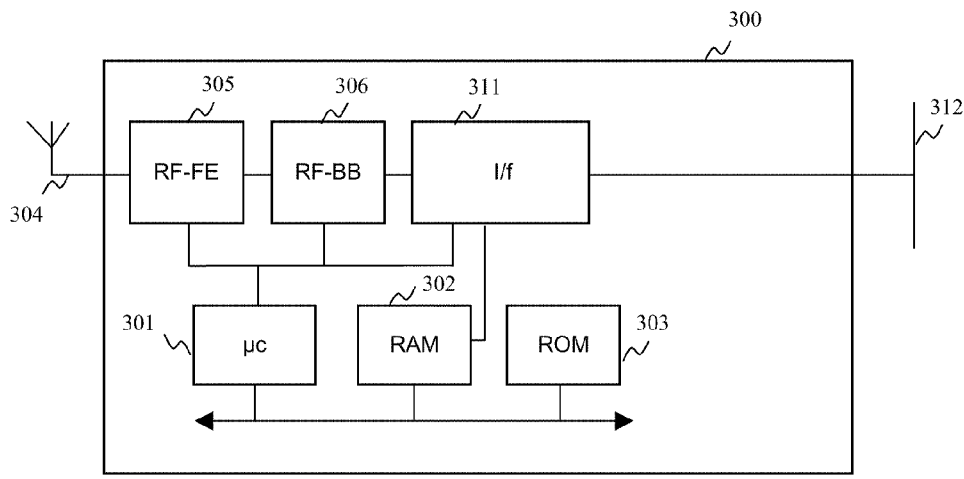
Figure 4:
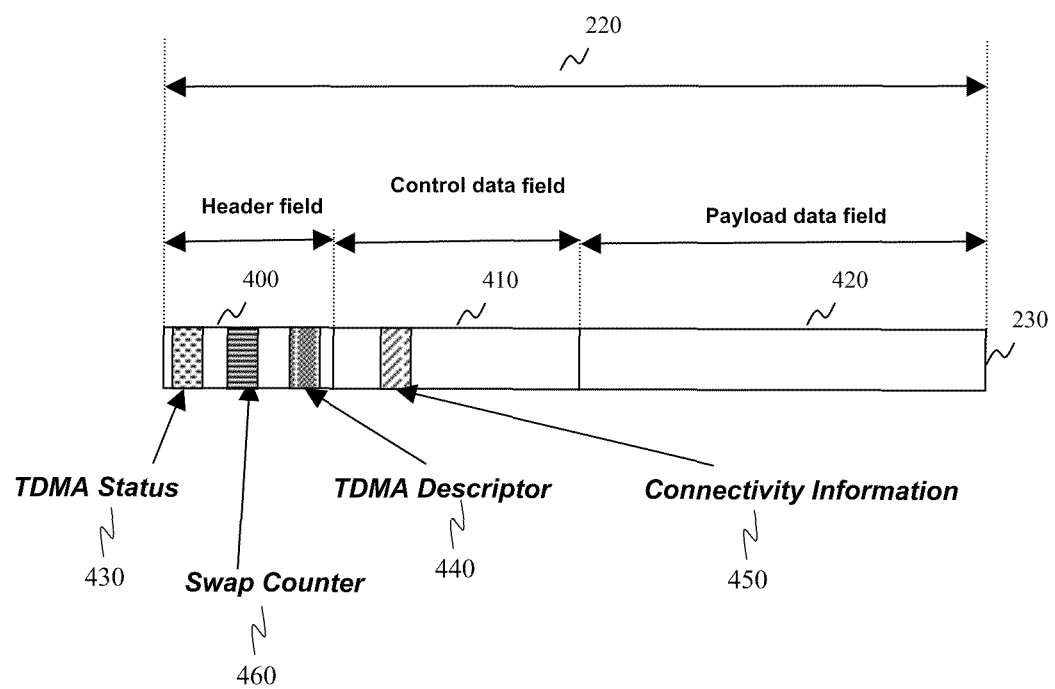
Figure 5A:
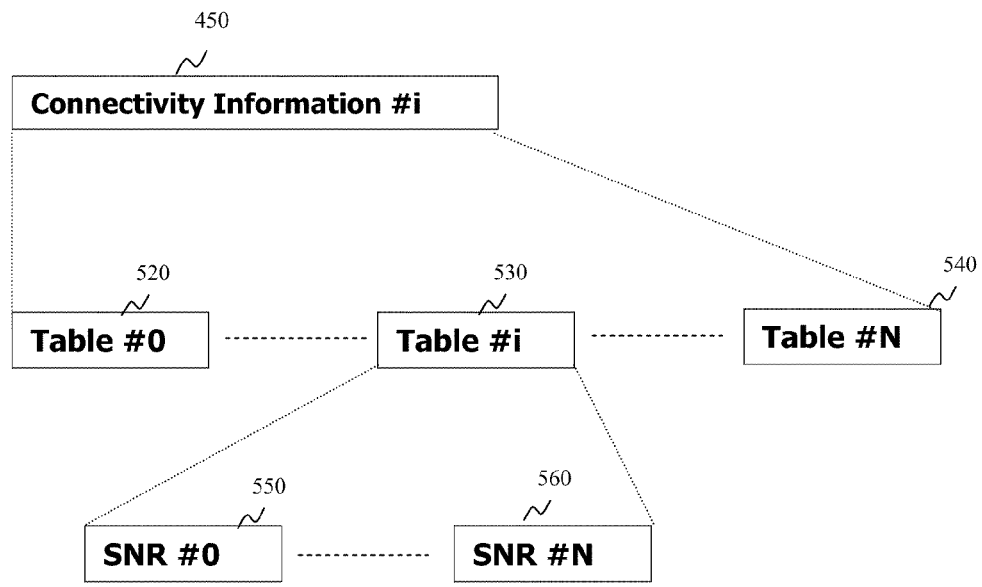
Figure 5B:
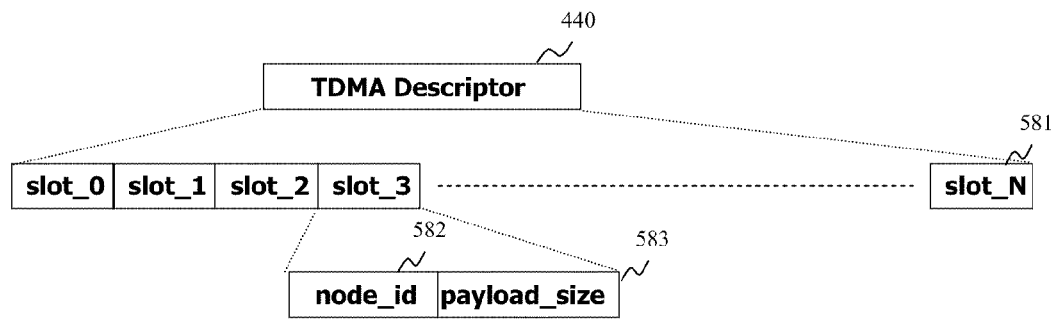
Figure 6:
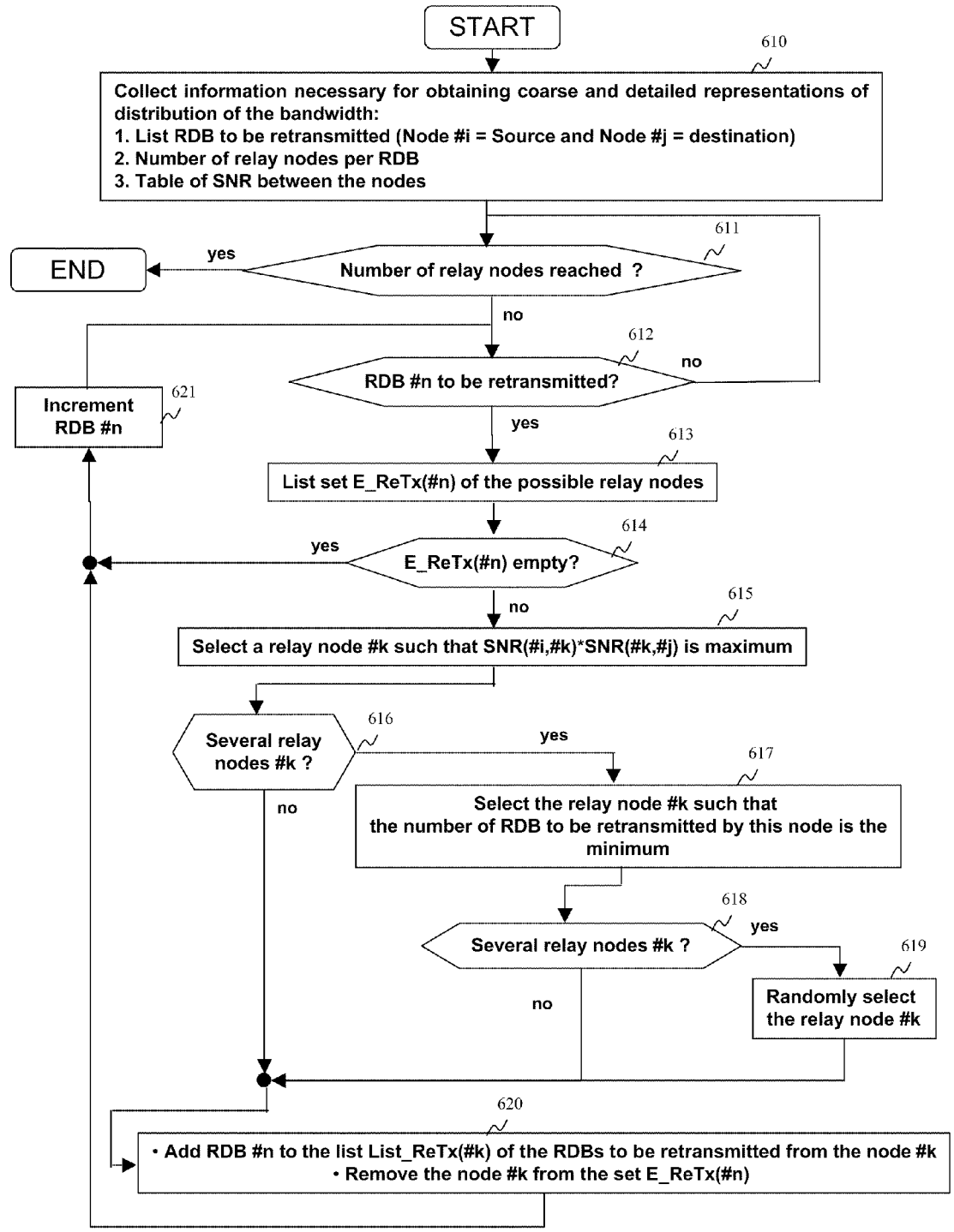
Figure 7:
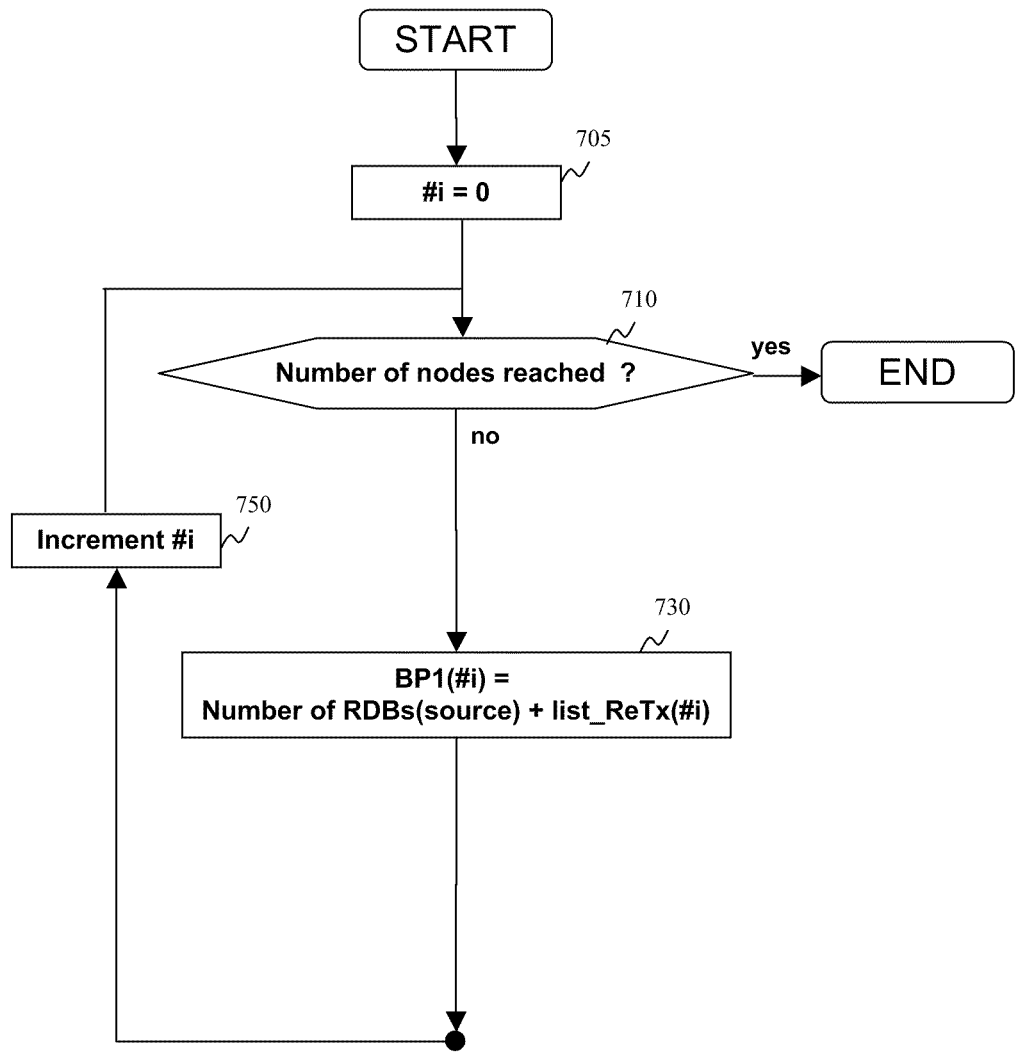
Figure 8:
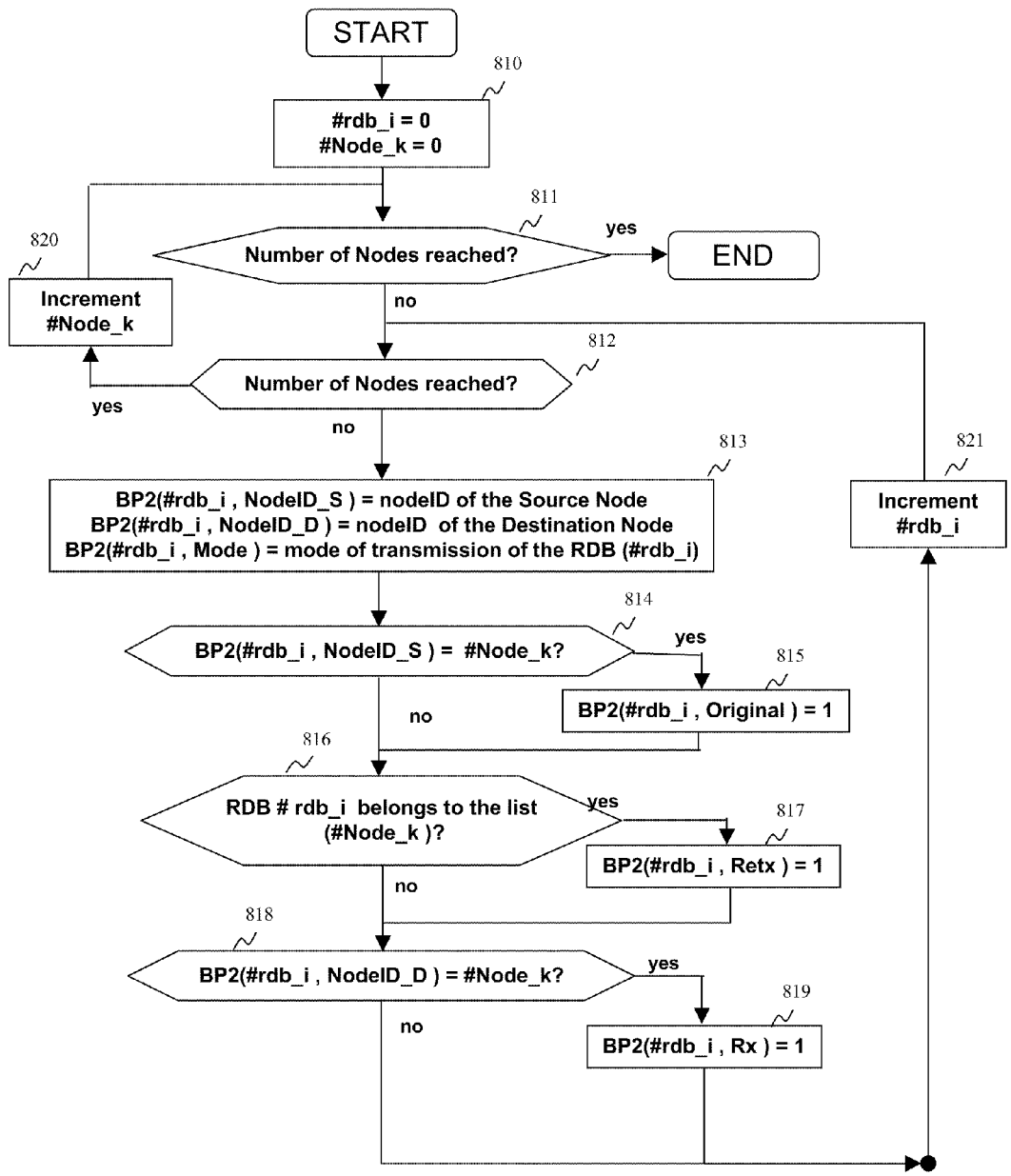
Figure 9:
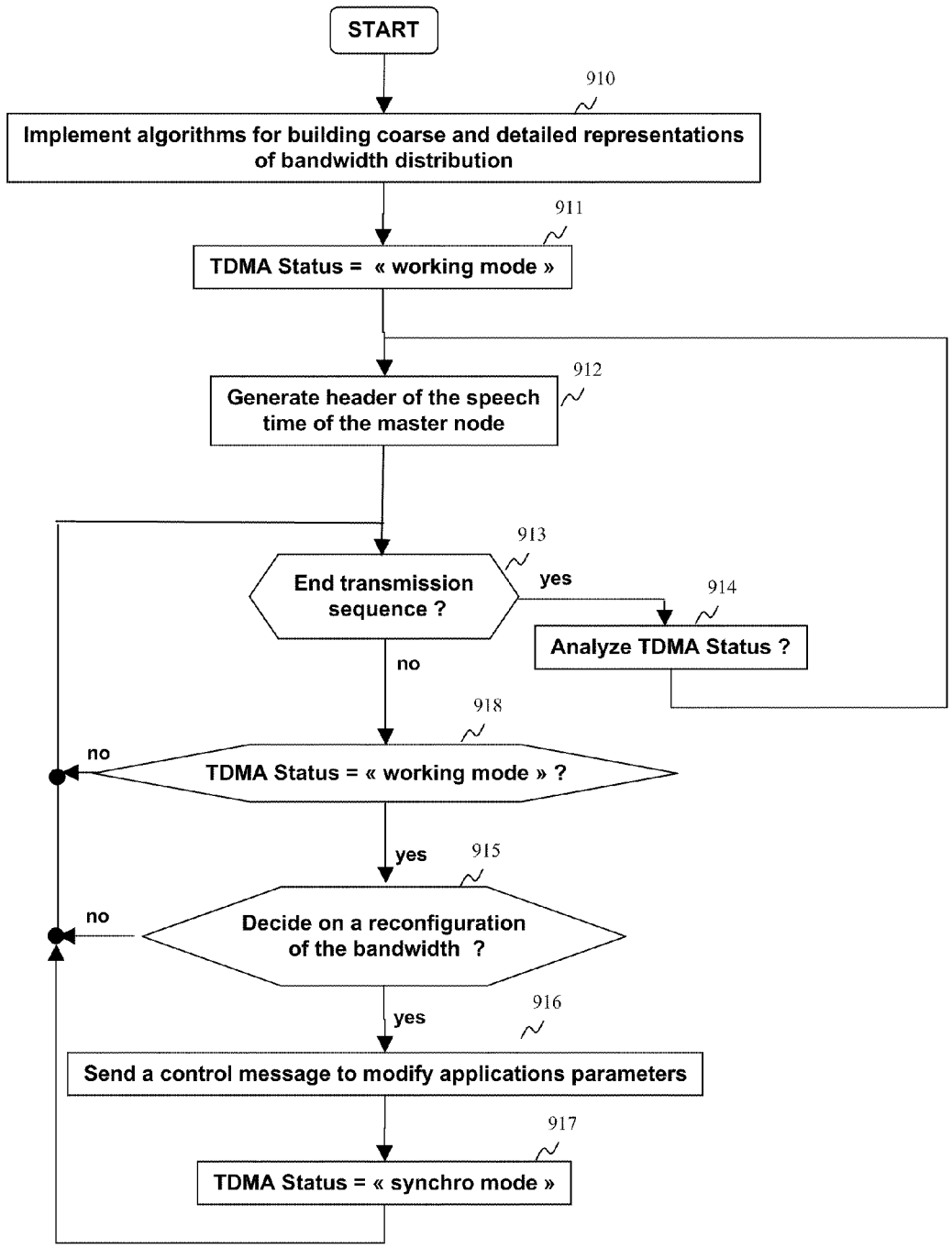
Figure 10:
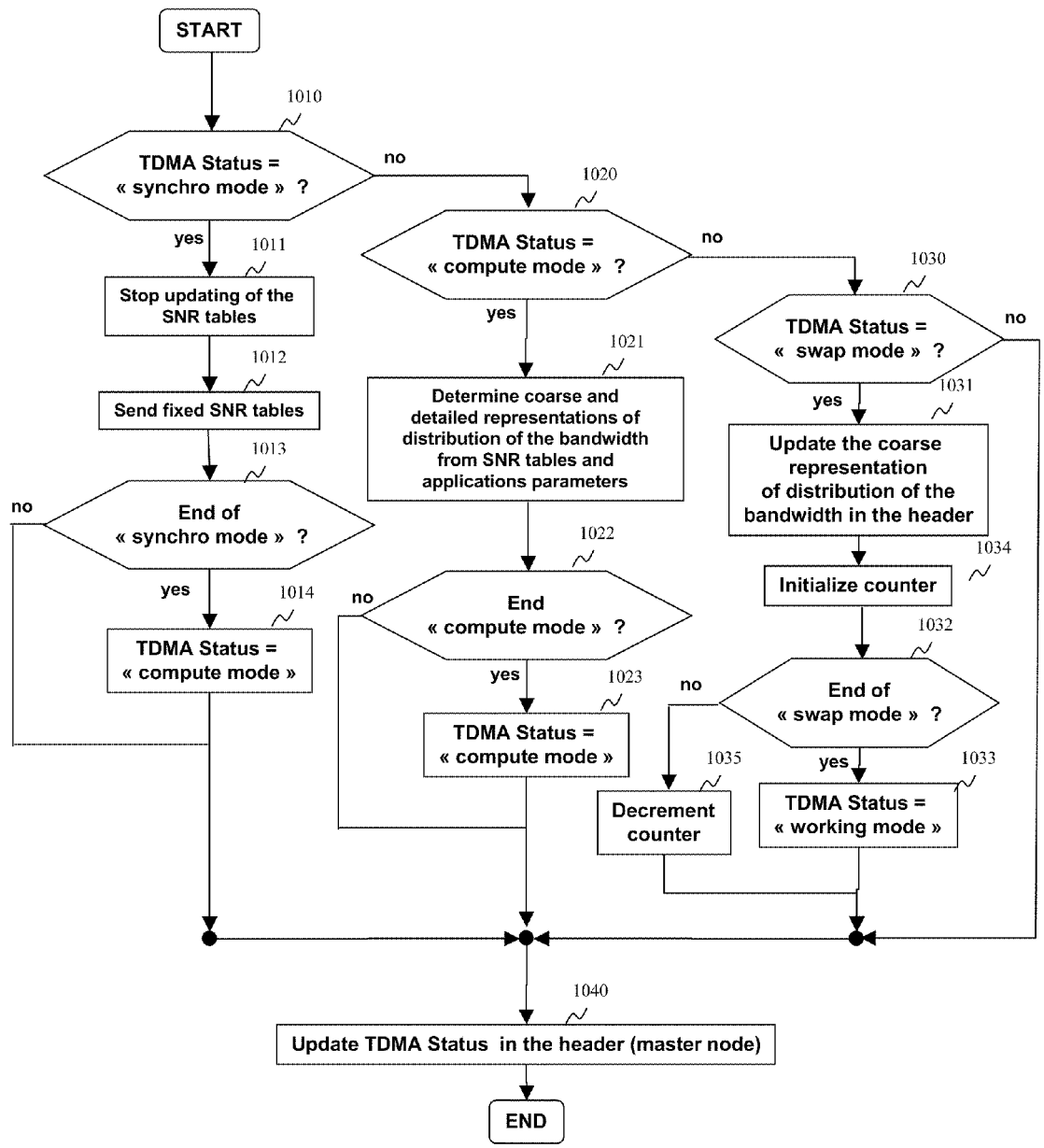
Figure 11:
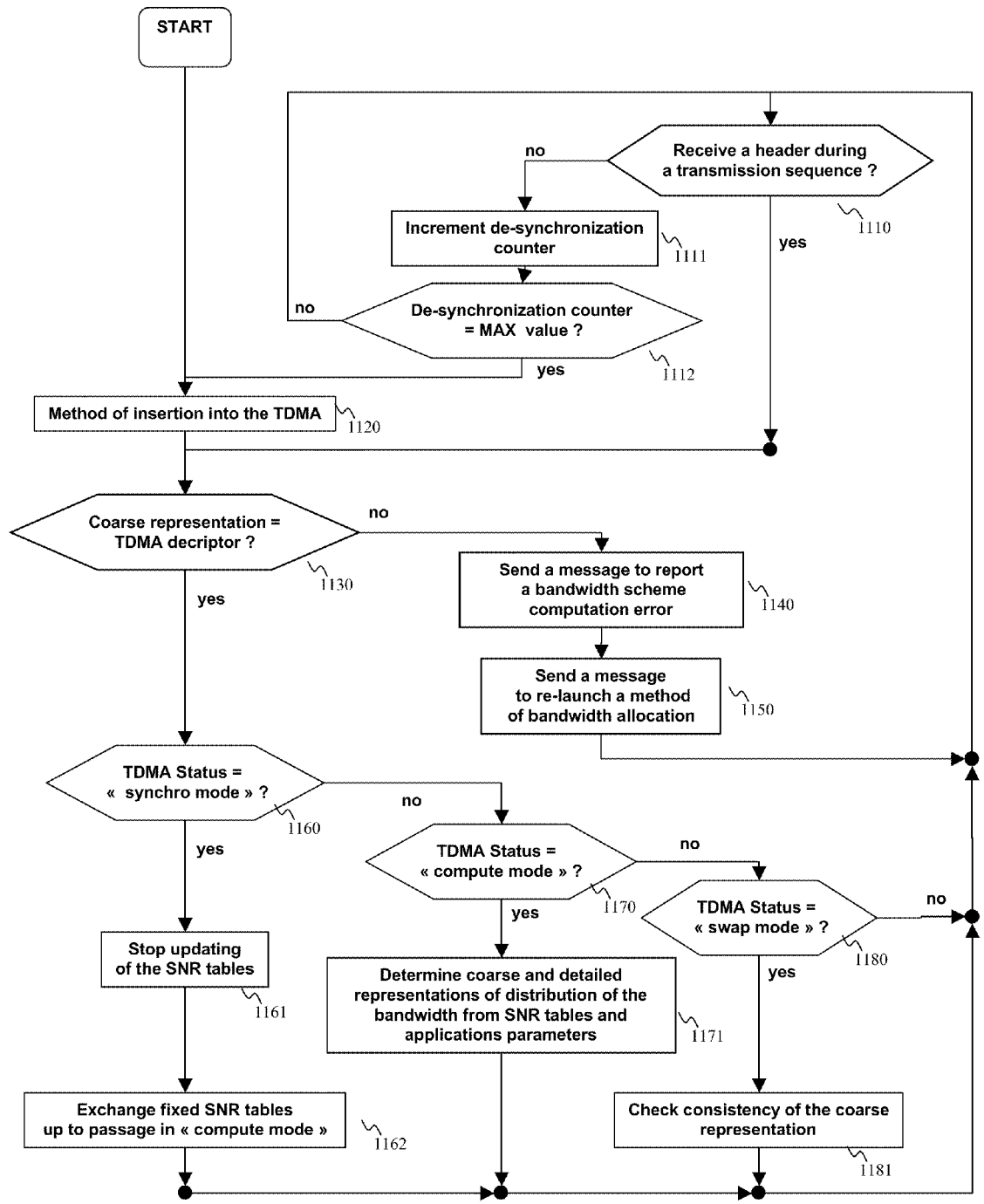

Other features and advantages of embodiments disclosed herein shall appear from the following description, given by way of an indicative and non-restrictive example and from the appended drawings, of which:

FIG. 1 presents an example of a wireless communications network in which a method for managing a distribution of bandwidth according to a particular embodiment can be implemented;

FIG. 2 shows an example of a TDMA type communication;

FIG. 3 presents a structure of a node of the network of FIG. 1, according to a particular embodiment;

FIG. 4 shows an example of a data packet emitted by a node of the network of FIG. 1, according to a particular embodiment;

FIG. 5a presents the structure of a piece of information on connectivity according to a particular embodiment;

FIG. 5b presents the structure of a of TDMA access sequence descriptor field according to a particular embodiment;

FIG. 6 presents the main steps of an algorithm for selecting relay nodes, according to a particular embodiment;

FIG. 7 presents the main steps of an algorithm for building a coarse representation of the distribution of the bandwidth, according to a particular embodiment;

FIG. 8 presents the main steps of an algorithm for building a detailed representation of the distribution of the bandwidth according to a particular embodiment;

FIG. 9 presents the main steps of an algorithm for re-configuring bandwidth implemented by a master node, according to a particular embodiment;

FIG. 10 represents a particular embodiment of the step 914 of FIG. 9; and FIG. 11 represents the main steps of an algorithm for re-configuring bandwidth implemented by a slave node, according to a particular embodiment.

5. DETAILED DESCRIPTION OF ILLUSTRATIVE EMBODIMENTS

FIG. 1 shows an example of a wireless communications network in which a method for managing a distribution of bandwidth according to a particular embodiment can be implemented.

The communication system is a 7.1 wireless audio network 100 comprising a sender node 112 with two transmit antennas 110 and 111 as well as a plurality of nodes which are both senders and receivers (nodes 120, 130, 140, 150, 160, 170, 180 and 190), the sending and the reception being then done alternately. The sender node 112 is a source of the audio content broadcast in the wireless network. The nodes are interconnected by radio communications links 101. Even if the radio signals are broadcast in every direction, it may happen that certain nodes are not capable of detecting these radio signals because of obstacles (giving rise to masking or shadowing problems). A radio link is therefore not necessarily present between a source node and any other node of the network. Relay functions (the term used then is "relay nodes") are then implemented to enable all the nodes of the network to receive data needed for it to operate.

The data stream is constituted by a plurality of data blocks and is conventionally protected against transmission errors through the use of an error corrector code (for example a Bose-Chaudhuri-Hocquenghem (BCH) code, a Reed-Solomon code, a turbo code etc). Generally, the data blocks of the data stream are grouped together in packets at the sender node level, each packet being then encoded so as to generate a plurality of parity blocks representing redundant information. At the receiver node, the received packets are decoded. The decoding consists of the removal of the potential errors in the received data blocks received through the use for this purpose of the parity blocks.

Relay nodes are used so as to provide spatial and temporal diversity to the data transmissions. This enables a receiver node of a piece of data (depending on interference and shadowing if any) to have several copies of this piece of data available at reception. Each of these copies then undergoes different constraints (sent in different transfer paths and at different times), thus facilitating the detection and correction of reception errors.

The relay nodes transfer encoded data as such without decoding or re-encoding the data stream. Indeed, the execution of the decoding and the re-encoding at each relay node could would significantly increase the memory needed for the temporary storage of the packets, increase the re-transmission time and unnecessarily consume computation resources.

In such a wireless communications network, a protocol such as the one described by the IEEE 802.15.3 standard can be implemented for example. Such a protocol enables each of the nodes of the network to benefit from a time of access to the medium according to a TDMA type communications mode.

Referring now to FIG. 2, we present an example of a TDMA type communication.

The time is divided into data transmission cycles (TDMA sequences) 210 and the physical support is shared in time so that each of the nodes of the network is allocated at least one time slot 220 per cycle to transmit its data 230. A single node transmits data in each time slot. Each time slot can transport a defined number of data blocks as represented by the detailed representation of the of the bandwidth distribution; thus, each of these data blocks has a corresponding time slot defined in the TDMA transmission cycle.

A TDMA cycle 210 has a plurality of communications time slots 220 allocated to sender nodes (whether or not they are relay nodes) of the network, so that these senders can communicate with the receiver nodes (whether or not they are relay nodes) of the network in sending data packets 230.

The clocking of the TDMA cycles is administered by a unique node of the network, called a master node. Such a master node may, for example, be fixed by configuration or designated by election when the network is initialized. The other nodes of the network, called slave nodes, must then get synchronized with the master node.

The master node has the role of managing the distribution of the bandwidth of the network. In other words, its role is to define the time slots (220) for access to the medium for each node of the network and prevent any change in the distribution of the bandwidth.

FIG. 3 shows the structure of a node of the network according to a particular embodiment.

The reference 302 is a random-access memory or RAM working as a main memory of a computation unit or CPU (denoted μc for microcontroller) 301. When the communications node is powered on, the CPU 301 is capable of executing instructions from the ROM 303. After the system has been powered on, the processor 301 is capable of executing instructions from the RAM 302 pertaining to a computer program (possibly downloadable from the network 312 through the input-output interface 311) once these instructions have been loaded from the ROM 303 or from an external memory (not shown in FIG. 3). A computer program of this kind, if executed by the CPU 301, prompts the execution of all or part of the steps of the algorithms or protocols illustrated by FIGS. 6 to 11, described here below.

The module 305 (denoted as RF-FE or radio frequency-front-end) designates the module responsible for matching the output signal of the base-band unit 306 before it is sent out by means of an antenna 304 (by frequency transposition and power amplification for example); this module is furthermore adapted to receiving an antenna signal at 304 for delivery to the module 306. The base-band unit 306 performs an operation for modulating the digital data given by the input-output interface 311 (denoted I/f for interface) and performs an operation for demodulating the data given by the module 305.

As illustrated in FIG. 4, each data packet 230 comprises:
 a header field 400 conveying configuration information for the TDMA cycle.

According to one particular embodiment, this header field 400 itself comprises:
 a field containing a piece of information on the identity of the node of the network transmitting in each of the time slots 220;
 a "TDMA descriptor" field 440 containing description information for the TDMA cycle;
 a "TDMA Status" field 430 containing information on the status of the TDMA cycle; and
 a "Counter Swap" field 460 containing information on a counter. As shall be seen here below, such a "Counter Swap" field is used to provide for synchronous switching of the set of nodes of the network in a new bandwidth distribution scheme;
 a control data field 410 enabling each of the nodes of the network to transmit control data (for applications needs in terms of bandwidth for example) to the other nodes of the network. In one preferred embodiment, this control data field 410 has a zone dedicated to a piece of information on connectivity 450 (described here below with reference to FIG. 5a); and
 a payload data field 420 enabling each of the nodes of the network to transmit data of any other type (for example audio, video and other data) than that transmitted in the field 410.

According to one particular embodiment, the positioning of the header field 400 and control data field 410 within a data packet 230 is the same whatever the data packet 230. The position of the header field 400 and the position of the control data field 410 is predefined and known by all the nodes. Thus, even if a node does not know the detailed representation of the distribution of the bandwidth, for example because it has not obtained a correct value by computation of the detailed representation of the distribution of the bandwidth, this enables it to receive control data from the other nodes of the network and send out control data to the other nodes.

The control data field 410 and payload data field 420 each have a set of radio data blocks (RDB). As shall be seen here below, this type of data block is used as a basic unit of transmission for each node of the network.

The pieces of data to be transmitted on the network constitute a set of radio data blocks (RDB) to be transmitted by each node of the network during their time slot 220 for accessing the medium allocated by the master node. Thus, according to one particular embodiment, the bandwidth of the network is defined by a coarse representation of the distribution of the bandwidth and by a detailed representation of the distribution of the bandwidth.

The coarse representation of the distribution of the bandwidth defines a sequence of access to the network, specifying the time slots allocated to the nodes in the transmission cycle. As shall be seen here below, the master node computes and transmits a coarse reference representation to the slave nodes of the network. Each slave node, during the medium access time slot allocated to it, relays this coarse reference representation through the "TDMA descriptor" field 440 of the header field 400.

The detailed representation of the distribution of the bandwidth defines, for each time slot, a specific data field described here below with reference to FIG. 8. Thus, this detailed representation makes it possible to define the configuration, i.e. the position and function (for example the audio or video type of data block) of each radio data block (RDB) within each time slot during the TDMA cycle 210.

As shall be seen here below, each node of the network determines a detailed representation of the distribution of the bandwidth from information on conditions of communication in the network (for example from a piece of information on connectivity 450) and applications parameters (for example a number of relay nodes assigned to each radio data block).

The change in bandwidth allocation can come into play for various reasons such as for example the insertion or elimination of nodes in the network, the sending of a bandwidth modifying request by a node of the network (for example in the case of addition or elimination of applications) or a reaction to changes in transmission conditions.

The master node manages each change in bandwidth allocation by means of a piece of information on status "TDMA Status" 430 and a piece of information on a counter "Counter Swap" 460. Each slave node of the network copies these pieces of information into its "TDMA Status" field 430 and "Counter Swap" field 460 in order to relay them during the medium access time slot allocated to it.

Referring now to FIG. 5a, we present the structure of a piece of information on connectivity according to one particular embodiment.

The piece of information on connectivity 450 contains all the connectivity information linking all the nodes of the network. The information on connectivity 450 is transmitted in the fixed control data field 410. At each new TDMA cycle 210, each node #i of the network rebuilds its piece of connectivity information 450 by updating:
 its connectivity table "table #i" designated by the reference 530, bringing together the quality of its radio communications link with each other node of the network (550, 560). The quality of the radio link between two nodes of the network may, for example, be represented by its signal-to-noise ratio (SNR);
 the most recent connectivity tables 520, 540 received by the other nodes of the network.

Thus, the piece of information on connectivity 450 enables all the nodes of the network to have real-time knowledge of the quality of the radio link between all the nodes of the network.

FIG. 5b presents the structure of a "TDMA descriptor" field according to one particular embodiment.

The "TDMA descriptor" field 440 contains a coarse representation of the distribution of bandwidth. This representation provides information on:

the position of the medium access time slot (transmission time slot) for each node of the network ("Slot_0" to "Slot_N"), designated by the reference 581;
    and for each of these time slots:
        the identifier 582 of the node of the network ("node_id") using the time slot considered;
        the length 583 ("payload_size") of the time slot considered.

The master node defines the pieces of description information of the TDMA cycle. Each slave node of the network copies out these pieces of information into its "TDMA descriptor" field in order to relay them during the medium access time slot allocated to it.

FIG. 6 presents the main steps of a relay node selection algorithm implemented by a node of the network according to a particular embodiment.

To build the coarse and detailed representations of the distribution of bandwidth, for each node of the network, it is proposed to determine the radio data block or blocks that it must relay. Thus, at the end of this algorithm, each node of the network is assigned a list of the radio data blocks to be relayed, denoted List_ReTx( ).

At the step 610, a list is made of the radio data blocks "RDB#n" to be relayed. According to one particular embodiment, each radio data block "RDB#n" is relayed by a number N of relay nodes, with N≥1. In one particular embodiment, this number N of relay nodes is predetermined when the system is set and is known to all the nodes of the network. In one alternative embodiment, this number N of relay nodes is determined by the master node at each modification of the distribution of the bandwidth. At this same step 610, the information on connectivity 450 built by each node of the network is retrieved.

The steps 611 to 620 described here below are performed for each radio data block "RDB#n".

At the step 613, a set of possible relay nodes "E_ReTx(#n)" is determined for the radio data block "RDB #n" considered.

At the step 614, a check is made to ascertain that the set of possible relay nodes "E_ReTx(#n)" is empty. If the set "E_ReTx(#n)" is empty, then the operation passes to a step 621. If not, it passes to the step 615.

At the step 612, a check is made to see if there is a remaining radio data block "RDB #n" for which it is necessary to select N relay nodes. In the event of a positive check, the operation returns to the step 613. If not, the operation passes to the step 611.

At the step 611, it is ascertained that N relay nodes have been selected to relay the radio data block "RDB #n" considered. Should the number N of relay nodes not be attained, the operation returns to the step 612.

At the step 615, one relay node is selected among the possible relay nodes of said set "E_ReTx(#n)". The node chosen then is the one for which the product of the signal-to-noise ratio SNR (#i,#k) between the sender node #i of the radio data block RDB#n and the possible relay node #k and the signal-to-noise ratio SNR(#k,#j), between the possible relay node #k of the radio data block RDB #n and the receiver node #j of the radio data block RDB #n is the maximum. In one alternative embodiment, the values of the signal-to-noise ratios can be classified in several categories. The fact of working with values of categories rather than with real values (sampling) enables less information to be transmitted.

At the step 616, a check is made to see if, at the end of the step 615, several possible relay nodes are selected. In the event of a positive check, the operation passes to the step 617. If not, it passes to the step 620.

At the step 617, among the possible relay nodes selected at the end of the step 615, a node is selected which is the node possessing the lowest re-transmission load. Such a load is characterized by the number of radio data blocks RDB already to be re-transmitted. Thus, the node having the smallest number of radio data blocks RDB to be relayed is selected.

At the step 618, a check is made to see if, at the end of the step 617, several possible relay nodes are selected. In the event of a positive check, the operation passes to the step 619. If not, it passes to the step 620.

At the step 619, a random selection is made of a relay node #k from among the possible relay nodes selected at the end of the step 617. Then the operation passes to the step 620.

At the step 620, the list of radio data blocks to be relayed Liste_ReTx(#k) of the relay node #k (selected at the end of the step 615, 617 or 619) is updated. More specifically, the radio data block RDB #n is added to the list Liste_ReTx(#k) of the relay node #k.

According to one particular embodiment, after the step 620 is executed, the relay node #k selected from the set of possible relay nodes "E_ReTx(#n)" is eliminated. Thus, this relay node #k is prevented from being selected a second time. This enables a better distribution of the relay nodes for a same radio block RDB #n.

Following the step 620, the step 621 is executed. During this step 621, the next radio data block RDB #n is selected.

Naturally, the disclosure is not limited to the exemplary embodiment mentioned here above. In other exemplary embodiments, the selection of the relay node #k can be done according to any other combination of the steps 615, 617 and 619 mentioned here above or according to other selection criteria.

FIG. 7 presents the main steps of an algorithm for building a coarse representation of the distribution of bandwidth implemented by a node of the network, according to a particular embodiment.

The building of a coarse representation of the distribution of the bandwidth consists in building a table BP1 in which each node #i of the network has an associated number BP1 (#i) of radio data blocks RDB to be transmitted during the medium access time slot that has been allocated to it.

In a step 705, a variable "i" is set at zero. This variable is incremented whenever a node of the network is processed (step 750) until it is determined (step 710) that all the nodes of the network have been processed.

Thus, each node #i of the network has an associated number BP1 (#i) equal to the sum of the number of radio data blocks RDB for which the node #i is a sender node and the number of radio data blocks RDB to be relayed contained in the list list_ReTx(#i) of the node #i (step 730).

FIG. 8 presents the main steps of an algorithm for building a detailed representation of the distribution of bandwidth implemented by a node of the network, according to one particular embodiment.

The building of a detailed representation of the distribution of bandwidth consists in building a table BP2 in which pieces of configuration information associated with each radio data block RDB "i" transmitted by each node "k" of the network is brought together. This table BP2 includes a number of elements equal to the total number of radio data blocks sent by all the nodes of the network.

The table BP2 contains, for each data block RDB:
an identifier of the source node, denoted NodeID_S;
an identifier of the destination node, denoted NodeID_D;
a piece of information on the transmission mode to which the data block RDB considered (audio channel, video stream etc) belongs;
an original parameter indicating whether the node considered is a source of the data block considered;
a parameter Retx indicating whether the data block RDB considered must be relayed by the node considered; . . .
a parameter Retx indicating whether the data block considered should be processed by the decoding mechanism of the node considered in order to be transmitted to the upper layer (application).

When the algorithm is started, all the elements of the table BP2 are set at zero.

In a step 810, variables #rdb_i and #Node_k are set at zero and then a step 811 is executed. At the step 811, a test is made to see if the number of nodes included in the network has been reached, i.e. if the variable #Node_k has reached the number of nodes included in the network minus one unit. If this is the case, the algorithm is brought to an end; if not, a step 812 is executed. At the step 811, a test is made to see if the number of radio data blocks RDB for the node #Node_k considered has been reached. If this is the case, a step 820 is executed, in which the variable #Node_k is incremented before the step 811 is performed again; if not, a step 813 is executed.

At the step 813, the parameter NodeID_S associated with the data block RDB represented by the variable #rdb_i, denoted BP2(#rdb_i, NodeID_S), is updated with the identifier of the sender node which is the source of the data block #rdb_i. Then, the parameter NodeID_D associated with the radio data block RDB represented by the variable #rdb_i, denoted BP2(#rdb_i, NodeID_D), is updated with the identifier of the receiver node which is the destination of the data block #rdb_i. Finally, the parameter Mode associated with the data block RDB represented by the variable #rdb_i, denoted BP2(#rdb_i, Mode), is updated with a piece of information representing the transmission mode to which the radio data block RDB #k belongs (namely audio channel, video stream etc). Then a step 814 is performed.

At the step 814, a test is made to see if the source node of the data block #rdb_i, denoted BP2(#rdb_i, NodeID_S) corresponds to the node identified by the variable #Node_k. If this is the case, a step 815 is performed. If not, a step 816 is performed. At the step 815, the original parameter associated with the data block RDB represented by the variable #rdb_i, denoted BP2(#rdb_i, Original) is updated with the value "1". Then, the step 816 is executed.

At the step 816, a test is made to see if the data block RDB represented by the variable #rdb_i belongs to the list list_ReTx associated with the node identified by the variable #Node_k. If this is the case, a step 817 is executed; if not, a step 818 is executed. At the step 817, the parameter Retx associated with the data block represented by the variable #rdb_i, denoted BP2(#rdb_i, Retx) is updated with the value "1". Then, the step 818 is executed.

At the step 818, a test is made to see if the destination node of the data block #rdb_i, denoted BP2(#rdb_i, NodeID_D) corresponds to the node identified by the variable #Node_k. If such is the case, a step 819 is executed; if not, a step 821 is executed. At the step 819, the parameter Rx associated with the data block RDB represented by the variable #rdb_i, denoted BP2(#rdb_i, Rx) is updated with the value "1". This indicates that the data block identified by #rdb_i should be processed by the decoding mechanism for transmission to the upper layer (application). Then, the step 821 is executed.

At the step 821, the variable #rdb_i is incremented by one unit and the step 812 is executed again.

According to one particular embodiment, each node determines its own detailed representation of the distribution of the bandwidth. In this way, the transmission of such detailed representations of the distribution of the bandwidth in the network is prevented, and this is particular worthwhile in terms of bandwidth consumption.

FIG. 9 presents the main steps of an algorithm for re-configuring the distribution of the bandwidth implemented by the master node according to a particular embodiment.

The master node manages a change in bandwidth allocation by means of a piece of status information "TDMA Status" 430 and a counter "Counter Swap" 460 which are contained in the header 400. The status information "TDMA Status" 430 provides information on the mode of operation in which the master node is situated. The counter "Counter Swap" provides information on the number of cycles before effective change-over to a new distribution of the bandwidth.

According to one particular embodiment, the master node can work according to four distinct modes of operation:
a working mode which is the established working mode;
a synchronization mode denoted "synchro mode";
a computation mode denoted "compute mode"; and
a switching mode, denoted "swap mode".

When the system is initialized (step 910), the master node implements the building algorithms described here above with reference to FIGS. 7 and 8, in order to build coarse and detailed representations of the distribution of the bandwidth.

The status information "TDMA Status" is then updated with the "working mode" (step 911).

At each start of a TDMA cycle 210 (step 912), the master node builds the header of its data packet on the basis of the coarse representation of the distribution of the bandwidth (obtained at the step 910) and the status information <<TDMA Status" 430.

At the step 913, the end of the TDMA cycle 210 is detected. In the event of positive detection, the operation passes to the step 914. If not, it passes to the step 918. The step 914 for analyzing the status information "TDMA Status" is described more precisely in FIG. 10.

At the step 918, it is ascertained that the status information "TDMA Status" indicates the "working mode". In the event of a positive check, the operation passes to the step 915. If not, there is a return to the step 913.

During the running of the TDMA cycle 210, the master node detects whether the distribution of the bandwidth has to be modified (step 915). The modifications of allocation (or distribution) of bandwidth can take place for various reasons such as for example the insertion or elimination of nodes into the network, the sending of a bandwidth modifying request by a slave node of the network (for example in the event of an addition or elimination of application) or a reaction to changes in transmission conditions.

When a modification of allocation (or distribution) of bandwidth calls for a modification of the applications parameters, the master node transmits a controlled message by means of its control data field 410 to all the slave nodes of the network, and does so before the execution of an algorithm for re-configuring the distribution of the bandwidth at each node, whether master or slave (step 916).

At the step 917, the TDMA status information indicates the "synchro mode". This means that the master node goes into the synchronization mode. The changing from "working mode" to the "synchro mode" marks the start of the re-configuring of the distribution of bandwidth at the master node.

In the embodiment illustrated, it can be noted that the step 918 ensures that no re-configuration of the bandwidth can be done so long as the master node works in the "synchro mode", i.e. so long as there is a re-configuration of bandwidth in progress.

Referring now to FIG. 10, we present a particular embodiment of the step 914 of FIG. 9 (algorithm for re-configuring the distribution of the bandwidth implemented by the master node).

The step 914 for analyzing status information <<TDMA Status" comprises:
- a data synchronization phase (steps 1010 to 1014);
- a phase for building a coarse and detailed representation of the distribution of the bandwidth (steps 1020 to 1023); and
- a change-over phase (1030 to 1035).

When no re-configuration of the bandwidth is in progress, the status information <<TDMA Status" is simply copied out into the header of the data packet of the master node.

Here below, we describe the steps 1010 to 1014 on the data synchronization phase.

At the step 1010, a check is made to see whether the status information "TDMA Status" indicates the "synchro mode". In the event of a positive check, the operation passes to the step 1011. If not, it passes to the step 1020.

At the step 1011, the master node stops updating its information on connectivity but continues to transmit (step 1012) a fixed piece of information on connectivity 450, until the end of the re-configuration of the bandwidth.

At the step 1013, a check is made to see if the synchronization phase is terminated. The duration of the synchronization phase should not be chosen randomly. It should be at least equal to the sum of a duration of de-synchronization of the slave nodes and of the latency of transmission of a piece of data through the network (i.e. including relays that may possibly be necessary).

The term "de-synchronization time" denotes the maximum number of consecutive transmission cycles during which a node of the network receives no piece of synchronization information (i.e. no header of a data packet sent by another node of the network) before the node is excluded from the network, i.e. the time starting from which the drift of its internal clock relative to that of the master node has crossed a critical threshold for the synchronization of the network. Thus, at the end of the synchronization phase, the chances of efficient reception of information on connectivity of each of the nodes of the network are the maximum.

When the synchronisation phase is terminated, the master node reports the passage to the phase for building bandwidth representations by modifying (step 1014) its status information "TDMA status". More specifically, the status information <<TDMA Status" indicates the "compute mode" (step 1040).

Here below, a description is provided of the steps 1020 to 1023 of the phase for building coarse and detailed representations of the distribution of bandwidth.

At the step 1020, it is ascertained that the status information <<TDMA Status" indicates the "compute mode". In the event of a positive check, the operation passes to the step 1021, else it passes to the step 1030.

At the step 1021, the master node implements the algorithms for selecting and building described here above with reference to FIGS. 6, 7 and 8 in order to build the coarse and detailed representations of the distribution of bandwidth.

At the step 1022, a check is made to see if the building phase is terminated. The duration (predefined or predetermined) of the building phase must enable each node of the network to build its own coarse and detailed representations of the distribution of bandwidth.

When the building phase is terminated, the master node reports the passage to the change-over phase by modifying (step 1023) its status information "TDMA status". More specifically, the status information <<TDMA Status" indicates the "swap mode" (step 1040).

Here below, we describe the steps 1030 to 1035 on the change-over phase.

At the step 1030, a check is made to see if the status information <<TDMA Status" is indicating the "swap mode". If the check is positive, the operation passes to the step 1031, else it passes to the step 1040.

At the step 1031, the master node sends the slave nodes of the network the new coarse representation of the distribution of bandwidth. This step enables the slave nodes to check on the consistency of its own representation (coarse and detailed) of the distribution of bandwidth. Thus, if the slave node detects a difference between its own coarse representation of the distribution of bandwidth and the coarse representation given by the master node, then it can for example inform the master node of this through a control message. It is then possible to generate a new phase for modifying bandwidth or exceptionally, it is possible that the master node will erroneously send the slave node a message (possibly through one or more relays) the totality of the detailed representation of the distribution of the bandwidth.

At the step 1034, corresponding to the start of the change-over phase, the master node sets a counter. In other words, the master node sets the "Counter Swap" field with a predetermined value corresponding to the duration of the change-over phase (in terms of number of TDMA cycles). According to one particular embodiment, the duration of the change-over phase is at least equal to the duration of de-synchronisation of the nodes so that all the slave nodes detect the instants of change-over to the new representation of bandwidth.

The "Counter Swap" field is decremented by one unit at each new TDMA transmission cycle and this is done up to the value "0" signifying the change-over to the new representation of bandwidth.

At the step 1032, a check is made to see if the value of the "Counter Swap" field is equal to "0". In other words, the end of change-over is detected. In the event of positive detection, the nodes of the network change over synchronously to the new representation of bandwidth. If not, at the step 1035, the value of the "Counter Swap" field is decremented by one unit.

The steps 1034 and 1032 therefore enable the slave nodes to have knowledge at any time of the phase of changing over (i.e. an identified TDMA cycle) to the new representation of bandwidth. Thus, any problem of loss of synchronisation (i.e. non-reception of a data packet header during a number of TDMA cycles smaller than the predetermined maximum number) is averted.

When the change-over phase is terminated, the master node returns to the "working mode" (step 1033). The status information <<TDMA Status" then indicates the "working mode" (step 1040).

FIG. 11 presents the main steps of an algorithm for re-configuring the distribution of bandwidth implemented by a slave node according to one particular embodiment.

At the step 1120, the master node executes an algorithm for inserting a node into the TDMA cycle. Such insertion algorithms are well known to those skilled in the art and are therefore not described in detail here below.

At the step 1110, the slave node receives and decodes the headers of the other nodes of the network so as to obtain the status information of the TDMA cycle "TDMA Status" and the "Counter Swap" defined by the master node.

If the slave node receives no information during a TDMA cycle, then the slave node goes into a de-synchronized mode (step 1111). In de-synchronized mode, the slave node can either transmit information without guarantee of delivery and integrity or transmit nothing during the medium access time slot allotted to it. It can be noted that the slave node can reintegrate the TDMA cycle only after having received a new data packet header.

If the slave node remains far too long in the de-synchronized mode (in other words if a number of consecutive transmission cycles without header reception is greater than a maximum predetermined number), then the slave node is excluded from the network (step 1112). To reintegrate the network, the slave node must execute an insertion algorithm (step 1120).

After receiving and decoding headers, at the step 1130, the slave node compares the coarse representation of the distribution of bandwidth coming from the master node with its own coarse representation of the distribution of bandwidth. If the coarse representations of the distribution of bandwidth coincide, then the operation passes to the step 1160. If not, it passes to the step 1140.

At the step 1140, the slave node tells the master node of its dysfunctioning by sending it, through its control data field 410 (whose positioning is fixed), a message notifying an error in computation of bandwidth representation. Then, at the step 1150, the slave node sends a request, through its control data field 410, for generating a new phase for modifying the bandwidth.

In the steps 1160, 1170 and 1180, the node analyzes the status information "TDMA Status" sent by the master node and relayed by the other slave nodes of the network.

At the step 1160, if the status information "TDMA Status" indicates the "synchro mode", then the slave node performs the synchronisation of the data. More specifically, the slave node stops updating its information on connectivity (step 1161), but continues to transmit (1162) its fixed information on connectivity 450 to the other nodes of the network and continues receiving fixed information on connectivity coming from the other nodes. In this way, the set of nodes performs the determining of the coarse and detailed representations of the distribution of bandwidth on the basis of the same data (i.e. fixed information on connectivity). Then, the operation returns to the step 1110.

At the step 1170, if the status information "TDMA Status" indicates the "compute mode", then the slave node implements the selection and building algorithms described here above with reference to FIGS. 6, 7 and 8 in order to build the coarse and detailed representations of the distribution of bandwidth (step 1171). Then the operation returns to the step 1110.

At the step 1180, if the status information "TDMA Status" indicates the "swap mode" then, at the step 1181, the slave nodes compare the coarse representation of the distribution of bandwidth coming from the master node with its own coarse representation of the distribution of bandwidth. If the coarse representations of the distribution of bandwidth are identical, then the slave node can apply the detailed representation of the distribution of bandwidth which it has computed (step not shown). If not, it must apply the coarse representation of the distribution of bandwidth which it has received from the master node (step not shown). This new representation is applied only after the return to the "working mode".

The slave node then manages the counter enabling to change over into the new representation of the distribution of bandwidth at the same time as the other nodes of the network. Throughout the change-over phase, at each TDMA cycle, the value of this counter is compared with the one received from the other nodes of the network and is adjusted as needed.

The invention claimed is:

1. A method for managing a distribution of bandwidth in a communications network by a slave node of said network, said network comprising a set of nodes, wherein said slave node performs steps of:
    determining a coarse representation and a detailed representation of the distribution of the bandwidth in said network, as a function of a piece or pieces of information relative to conditions of transmission in said network;
    receiving a coarse reference representation of the distribution of the bandwidth in said network, coming from a master node of said network;
    comparing said determined coarse representation and said coarse reference representation;
    when said coarse representations are identical, applying said determined detailed representation; and
    when the coarse representations are not identical, sending a piece of control information to the other nodes of the network, indicating that the coarse and detailed representations determined by the slave node are incorrect,
    wherein said slave node sends out in a control data field said piece of control information, and wherein the control data field is contained in a time slot and has its position in said time slot predefined and fixed.

2. The method according to claim 1, wherein each coarse representation defines a sequence of access to the network, specifying transmission cycle time slots allocated to the nodes and wherein said detailed representation defines, for each time slot, data fields transmitted in said time slot.

3. The method according to claim 1, wherein said slave node applies said determined detailed representation when said coarse representations are identical or applies said coarse reference representation when said coarse representations are not identical, after a determined number of consecutive transmission cycles starting from the reception of a piece of information coming from said master node.

4. The method according to claim 1, wherein said slave node performs, preliminarily and upon reception of a piece of information coming from said master node and indicating a start of a period of information exchange of a predefined duration, steps of:
    receiving, from the other nodes of said network, fixed information relative to conditions of transmission in said network determined by said other nodes;
    transmitting, to said other nodes of said network, fixed information relative to conditions of transmission in said network determined by said slave node.

5. The method according to claim 1, wherein, when said coarse representations are not identical, said slave node further performs a step of sending to said master node a request for modifying the distribution of the bandwidth.

6. A non-transitory computer-readable storage medium, storing a computer program comprising a set of instructions executable by a computer in order to implement a method for managing a distribution of bandwidth in a communications network by a slave node of said network, said network comprising a set of nodes, wherein said slave node performs steps of:
    determining a coarse representation and a detailed representation of the distribution of the bandwidth in said network, as a function of a piece or pieces of information relative to conditions of transmission in said network;

receiving a coarse reference representation of the distribution of the bandwidth in said network, coming from a master node of said network;

comparing said determined coarse representation and said coarse reference representation;

when said coarse representations are identical, applying said determined detailed representation; and when the coarse representations are not identical, sending a piece of control information to the other nodes of the network, indicating that the coarse and detailed representations determined by the slave node are incorrect, wherein said slave node sends out in a control data field said piece of control information, and wherein the control data field is contained in a time slot and has its position in said time slot predefined and fixed.

7. A slave node comprising means for managing a distribution of bandwidth in a communications network comprising a set of nodes, wherein said slave node comprises:

means for determining a coarse representation and a detailed representation of the distribution of the bandwidth in said network, as a function of a piece or pieces of information relative to conditions of transmission in said network;

means for receiving a coarse reference representation of the distribution of the bandwidth in said network, coming from a master node of said network;

means for comparing said determined coarse representation and said coarse reference representation;

means for applying, that apply said detailed representation determined by said means for determining, when said means for comparing detect that said coarse representations are identical, and that send a piece of control information to the other nodes of the network, indicating that the coarse and detailed representations determined by the slave node are incorrect, when the coarse representations are not identical, wherein said piece of control information is sent out in a control data field, and wherein the control data field is contained in a time slot and has its position in said time slot predefined and fixed.

* * * * *